United States Patent [19]
Brown

[11] 3,745,437
[45] July 10, 1973

[54] REGULATOR CIRCUIT HAVING A MULTI-STEPPED REGULATING WAVE

[75] Inventor: Harold J. Brown, Lorain, Ohio

[73] Assignee: Lorain Products Corporation, Lorain, Ohio

[22] Filed: May 18, 1972

[21] Appl. No.: 254,697

[52] U.S. Cl. .................. 321/5, 307/105, 321/9 R, 323/8, 323/34, 323/119
[51] Int. Cl. ......................... G05f 1/56, G05f 1/68
[58] Field of Search .................... 321/9 R, 9 A, 5, 321/DIG. 1, 5 A; 323/106, 110, 119, 102, 124, 128, 34–37, 8; 307/105

[56] References Cited
UNITED STATES PATENTS
| | | | |
|---|---|---|---|
| 3,450,983 | 6/1969 | Koppelmann et al. | 323/119 |
| 3,584,286 | 6/1971 | Randall | 321/5 |
| 3,582,756 | 6/1971 | McMurray | 321/5 |
| 3,041,523 | 6/1962 | Kuba | 321/9 R X |
| 3,139,577 | 6/1964 | Krezek | 323/102 |
| 3,555,291 | 1/1971 | Dewey | 307/105 |

Primary Examiner—Gerald Goldberg
Attorney—John Howard Smith

[57] ABSTRACT

A circuit for providing a regulated a-c or d-c output voltage from an unregulated a-c input voltage. A series regulating network is disposed between the regulator input and the regulator output to support the difference between the unregulated input voltage and the regulated output voltage. A shunt regulating network is connected between the series regulating network and the regulator output to generate a plurality of regulating waves which, together with the input voltage, control the current through and voltage across the series regulating network. Output voltage sensing circuitry controls the phase angle between the input voltage and the regulating waves, as required, to establish and maintain the regulated output voltage.

13 Claims, 10 Drawing Figures

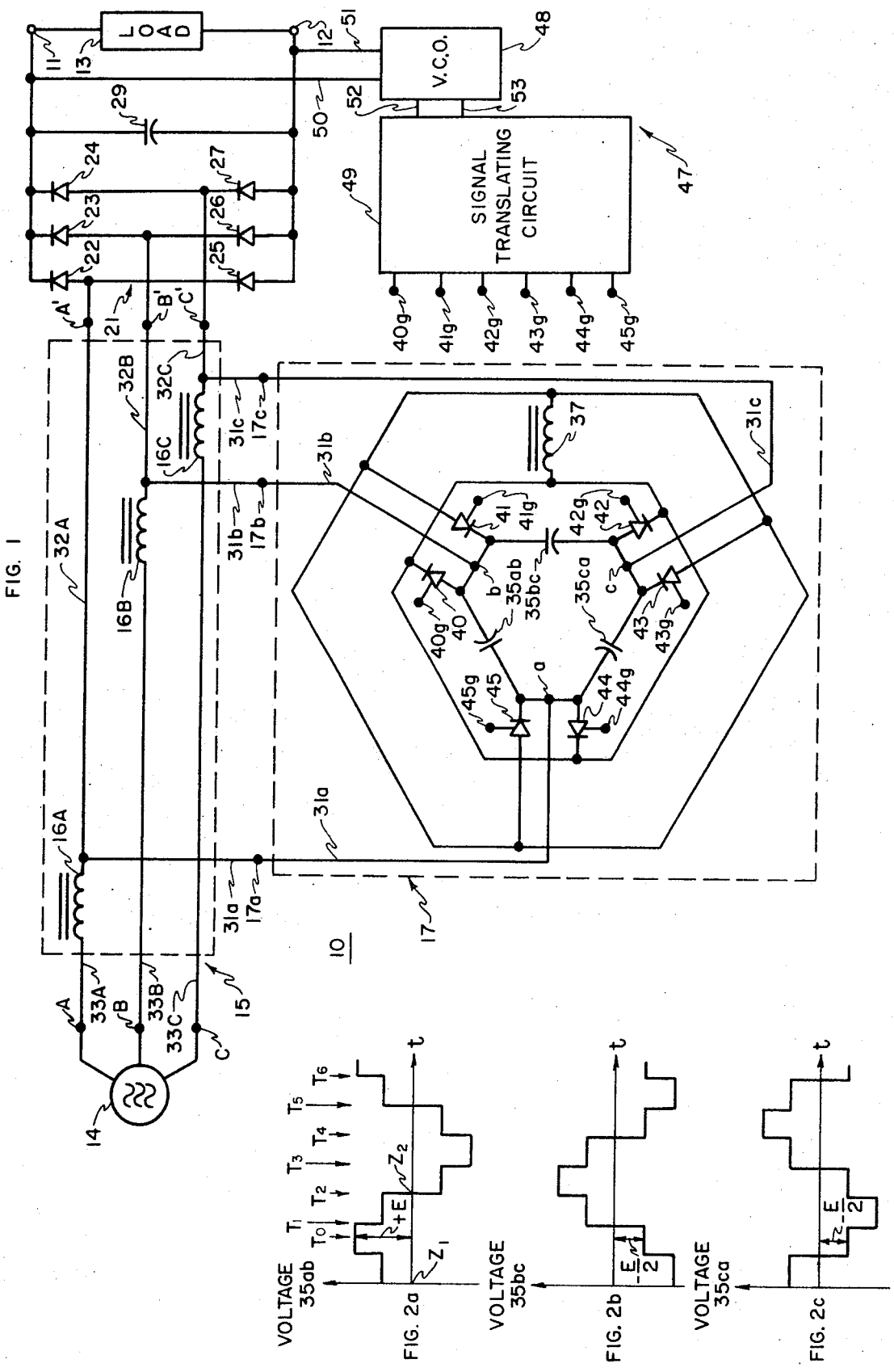

SHEET 2 OF 2
FIG. 3
|    | 40 | 41 | 42 | 43 | 44 | 45 |
|----|----|----|----|----|----|----|
| T1 | X  |    |    | X  |    |    |
| T2 | X  |    |    |    |    | X  |
| T3 |    |    | X  |    |    | X  |
| T4 |    | X  | X  |    |    |    |
| T5 |    | X  |    |    | X  |    |
| T6 |    |    |    |    | X  | X  |
FIG. 4
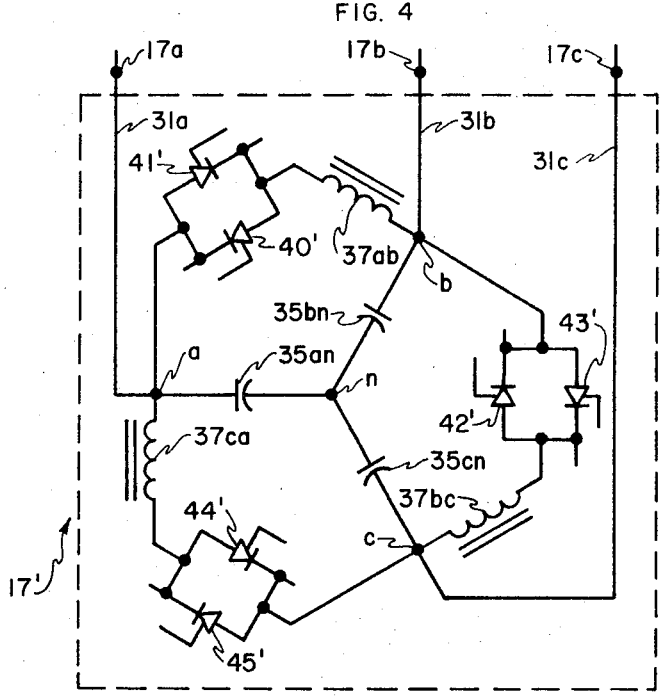
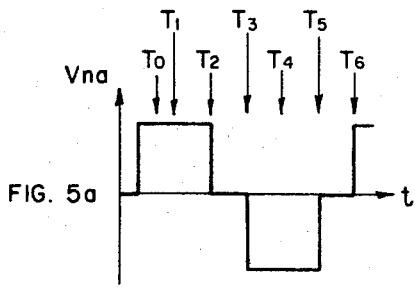
FIG. 5a
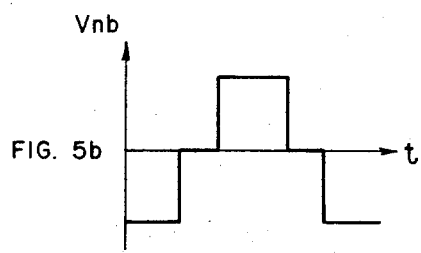
FIG. 5b
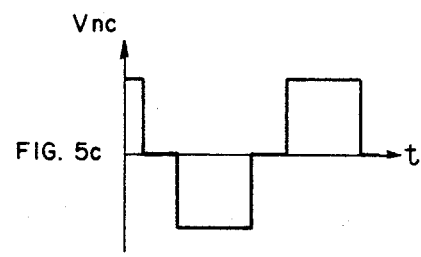
FIG. 5c
FIG. 6
|    | 40' | 41' | 42' | 43' | 44' | 45' |
|----|-----|-----|-----|-----|-----|-----|
| T1 |     |     |     | X   |     |     |
| T2 |     | X   |     |     |     |     |
| T3 |     |     |     |     | X   |     |
| T4 |     |     | X   |     |     |     |
| T5 | X   |     |     |     |     |     |
| T6 |     |     |     |     |     | X   |

REGULATOR CIRCUIT HAVING A MULTI-STEPPED REGULATING WAVE

BACKGROUND OF THE INVENTION

The present invention relates to voltage regulating circuits and is directed more particularly to regulating circuits wherein wave generating circuitry controls the voltage across and current through an inductor to maintain a substantially constant voltage at the regulator output.

Voltage regulator circuits utilizing series-connected inductors in connection with shunt-connected wave generating circuits have long been known and used for the purpose of providing a substantially constant output voltage from a variable a-c input voltage. Early forms of such regulator circuits were known as ferroresonant regulators and utilized wave generating circuits including capacitors and saturable core magnetic units. Such concepts are shown, for example, in U.S. Pat. No. 2,143,745 granted to J. G. Sola on Jan. 10, 1939 and U.S. Pat. No. 2,377,152 granted to H. M. Huge on May 29, 1945, which show respective single-phase and three-phase ferroresonant voltage regulators.

Because of the excessive weight and audible noise associated with the above saturable magnetic units and because of the difficulty of obtaining an output waveform of satisfactory harmonic content, much effort has been expended in attempting to improve ferroresonant type regulators. One attempt has involved the substitution of a plurality of series-connected, saturable core magnetic devices for each magnetic unit of circuits such as those of Huge and Sola. Such concepts are shown, for example, in U.S. Pat. No. 3,092,768 granted to A. Kusko on June 4, 1963 and U.S. Pat. No. 3,139,577 granted to D. Krezek on June 30, 1964. In circuits of the latter type series-connected magnetic devices saturate in a predetermined sequence to generate a waveform which is approximately sinusoidal. While circuitry of this type does provide a waveform of satisfactory harmonic content, it does not solve the problem of excessive circuit complexity, weight and audible noise.

AnOther attempt to improve ferroresonant voltage regulators has involved the substitution of gate controlled switching devices and linear inductances for the saturating magnetic units. Such concepts are shown, for example, in U.S. Pat. No. 3,076,924 granted to E. W. Manteuffel on Feb. 5, 1963. In such circuits, the linear inductance simulated the saturated impedance of the saturable magnetic unit and the gate controlled switching devices simulated the on-off conducting characteristic thereof. While the utilization of solid-state circuitry did greatly reduce the weight and noise associated with ferroresonant type voltage regulators, it did not solve the problem of high harmonic content. In addition, solid-state versions of earlier ferroresonant voltage regulators did not lend themselves to use in true three-phase voltage regulators. As a result, solid-state polyphase regulator circuits were produced by the uneconomical expedient of coupling together a plurality of single phase regulator circuits.

The above problems and limitations are eliminated by the instant invention which presents novel circuitry that affords any desired degree of waveshaping and that is usable in true polyphase voltage regulator systems and thus does not comprise a mere additive use of single phase circuitry.

SUMMARY OF THE INVENTION

It is an object of the invention to provide improved voltage regulating circuitry.

Another object of the invention is to provide voltage regulating circuitry including a shunt-connected wave generating circuit which generates a regulating voltage wave of controlled harmonic content.

It is still another object of the invention to provide voltage regulating circuitry of the above character which does not incorporate the disadvantages accompanying the use of saturable magnetic devices such as vibrations and audible noise.

Yet another object of the invention is to provide a voltage regulating circuit of the above character which generates a voltage wave of low harmonic content without serially adding a plurality of component voltage waves.

Another object of the invention is to provide a voltage regulating circuit including a wave generating circuit wherein wave generation results from the action of solid state switching devices on a plurality of co-operating electrical storage elements such as capacitors.

It is another object of the invention to provide a voltage regulating circuit of the above character in which the number of inductors in the wave generating circuit is less than or equal to the number of phases of the a-c input.

Another object of the invention is to provide a voltage regulating circuit in which the solid state switching devices are not exposed to excessive rates of change of voltage.

It is another object of the invention to provide a voltage regulating circuit including a shunt-connected wave generating circuit having one or more regulating terminals and including improved voltage control circuitry for changing the voltage at the regulating terminals in a predetermined sequence.

Still another object of the invention is to provide a voltage regulator of the above character wherein the voltage control circuitry includes a plurality of charge storage elements such as capacitors and charge control circuitry for changing the level of charge on the charge storage elements in a predetermined, stepped sequence.

Yet another object of the invention is to provide charge control circuitry which changes the level of charge on the capacitors by shifting all or part of the charge on one or more capacitors to one or more other capacitors, these changes in the level of charge comprising at least three steps per half-cycle.

Another object of the invention is to provide voltage regulating circuitry which, when used to provide a regulated d-c voltage, includes charge control circuitry that allows charge to be shifted between the charge storage elements within a relatively short time such as, for example, 1 percent of the period of each regulating wave.

It is still another object of the invention to provide voltage regulating circuitry of the above character including voltage control circuitry for controlling the timing of the above charge control circuitry in accordance with the magnitude of the voltage to be regulated.

DESCRIPTION OF THE DRAWINGS

FIG. 1 is a schematic diagram of one exemplary circuit embodying the invention.

FIGS. 2a, 2b and 2c show the voltages appearing at selected points in the circuit of FIG. 1 as a function of time.

FIG. 3 is a timing diagram showing the conductive states of selected circuit elements off FIG. 1.

FIG. 4 is a schematic diagram of a second exemplary circuit embodying the invention.

FIGS. 5a, 5b and 5c show the voltages appearing at selected points in the circuit of FIG. 4 as a function of time.

FIG. 6 is a timing diagram showing the conductive states of selected circuit elements of FIG. 4.

DESCRIPTION OF THE INVENTION

Referring to FIG. 1 there is shown voltage regulating circuitry 10 for producing a regulated voltage at the terminals 11 and 12 of a d-c load 13 from the unregulated voltage which a polyphase source 14 establishes at terminals A, B and C. Regulating circuit 10 includes a series regulating network 15 for supporting the difference between the unregulated a-c input voltage and the regulated output voltage. Regulating network 15 may include inductance means 16A, 16B and 16C which may, for instance, comprise separate windings on a single magnetic core. Regulating circuit 10 also includes a shunt regulating network 17 for controlling the voltage across and current through series regulating network 15, as required, to establish the desired output voltage at the required output current. Finally, regulating circuit 10 includes rectifying means which here takes the form of a three-phase rectifying bridge 21 including diodes 22, 23, 24, 25, 26 and 27 and a capacitor 29. It will be understood that if an a-c output voltage is required, rectifying circuit 21 and capacitor 29 may be eliminated and the desired output voltage and current may be drawn from terminals A', B' and C'.

Shunt regulating network 17 controls the regulating activity of regulating inductors 16A, 16B and 16C by generating a set of regulating waves on regulating terminals 17a, 17b and 17c. These regulating waves are applied to first respective ends of inductors 16A, 16B and 16C through conductors 31a, 31b and 31c. Since the polyphase input voltages of source 14 are applied to second respective ends of inductors 16A, 16B and 16C through conductors 33A, 33B and 33C, respectively, the voltage across and current through the regulating inductors is dependent upon the phase difference between the a-c input voltages generated by source 14 and the regulating voltage waves generated by shunt regulating network 17. Consequently, as will be described more fully presently, controlling the phase angle between the regulating voltages on terminals 17a, 17b and 17c and the a-c input voltage on terminals A, B and C, controls the voltage between d-c output terminals 11 and 12 (or a-c output terminals A', B' and C').

In the present embodiment, the energy which regulating network 17 requires to generate regulating waves at terminals 17a, 17b and 17c is drawn from the voltages between a-c conductors 32A, 32B and 32C through conductors 31a, 31b and 31c. The flow of energy into network 17 is manifested by the flow of charging current into a plurality of charge storage means which here take the form of capacitors 35ab, 35bc and 35ca. The latter capacitors are connected in delta between junctions a, b and c which are, in turn, connected to regulating terminals 17a, 17b and 17c. It will be understood that junctions a, b and c may be connected to polyphase line conductors 32A, 32B and 32C through the windings of any suitable transformer. One particularly suitable transformer configuration is a three-phase transformer having Wye-connected windings connected between junctions a, b and c.

As is well known, the sizes and weights of inductors and transformers are dependent upon the peak amplitudes and the waveforms of the voltages applied thereto. An inductor to which is applied a voltage waveform having a multiplicity of steps during each half-cycle thereof as, for example, is shown in FIG. 2a, can be made smaller than an inductor to which is applied a squarewave voltage waveform although the fundamental component of the squarewave may be equal to the fundamental component of the multi-stepped waveform. Accordingly, it will be seen that the more closely the steps in the voltages at terminals 17a, 17b and 17c allow the regulating waves to approach a sinusoidal waveform, the more closely the sizes and weights of regulating inductors 16A, 16B and 16C will approach their minimum values. This is equally true of transformers which may be utilized to couple networks 17 or 21 to conductors 32A, 32B and 32C.

The term "multi-stepped waveform," as used herein, means a waveform each half-cycle of which comprises a series of discrete voltage steps, the relative magnitudes of the steps being so arranged that they approximate or follow the contour of the desired waveform, in the present instance, a sinusoidal waveform. For general a-c power applications, the number of voltage steps during a half-cycle will be three or more and will be an odd number. This is because the utilization of an odd number less than three (one) results in a squarewave, that is, in a waveform which has excessive harmonic content and is, therefore, unsuitable for use in circuitry of FIG. 1. This is also because an even number of steps necessarily result in a waveform which is unsymmetrical about the mid-point of the half-cycle and, therefore, includes unnecessary and undesirable harmonic components. It will be understood, of course, that as the number of steps becomes larger than three, the effect of the unsymmetry resulting from the utilization of an even number of steps becomes smaller and may in appropriate circumstances be neglected. Thus, a "multi-stepped waveform" is preferably but not necessarily a waveform having an odd multiplicity of steps in each half-cycle.

Accordingly, from the foregoing it will be seen that, as one aspect of the invention, highly advantageous resuits will be attained by the use of a multiplicity of voltage steps per half-cycle.

To the end that the harmonic content of the regulating voltage waves may be limited or controlled, regulating network 17 includes charge control circuitry which here takes the form of a single inductor 37 and controllable switching means 40 through 45 here shown as suitable thyristors. This charge control circuitry controls the waveform of the regulating voltage waves by shifting or redistributing charge among capacitors 35ac, 35bc and 35ca in a predetermined or programmed sequence, the latter sequence being so arranged that the voltages appearing between junctions a, b and c have multi-stepped waveforms, in the present instance the waveforms shown in FIGS. 2a, 2b and 2c. The charge control circuitry also allows the times at which charge shifting occurs to be advanced or retarded with respect to the polyphase a-c input voltage. Thus, the charge control circuitry of FIG. 1 not only affords regulating waves of controlled harmonic content but also affords regulating waves which may be shifted in phase with respect to the a-c input voltage.

The manner in which the charge control circuitry of regulating network 17 operates will now be described. Referring to FIGS. 2a, 2b and 2c, it will be seen that at an arbitrarily assumed starting time $T_0$ the voltage across capacitor 35ab has a positive value of E, that is, that the charge on capacitor 35ab is such that terminal b is positive from terminal a by a voltage E. Similarly, the voltages across capacitors 35bc and 35ca have negative values of E/2. These conditions exist by virtue of previous switching activity.

The above conditions continue until time $T_1$ when thyristors 40 and 43 are fired to convert the charge pattern which is responsible for the voltages shown during time interval $T_0$-$T_1$ to the charge pattern which will establish the voltages shown during time interval $T_1$-$T_2$. The conversion takes place as capacitor 35bc resonantly discharges and recharges to the opposite polarity through the path including thyristor 40, inductor 37 and thyristor 43. In the course of this activity, thyristors 40 and 43 serve to initiate resonant discharging at the time when firing signals are applied to gates 40g and 43g thereof and serve to terminate resonant discharging at the time when the current through inductor 37 drops to zero.

During the above described resonant discharging of capacitor 35bc, capacitor 35ab transfers a portion of its stored charge to capacitor 35ca. This occurs because capacitors 35ab, 35bc and 35ca are connected in a closed current conducting path around which the sum of the voltages must be equal to 0. Consequently, the firing of thyristors 40 and 43 at time $T_1$ and the resultant reversal in the polarity of the voltage across capacitor 35bc causes a simultaneous change in the level of charge on capacitors 35ab and 35ca.

Similarly, the firing of thyristor pairs 40–45, 45–42, 42–41, 41–44 and 44–43 at times $T_2$, $T_3$, $T_4$, $T_5$ and $T_6$, respectively, as shown in FIG. 3, cause further redistributions of charge among charge storage capacitors 35ab, 35bc and 35ca to generate the remaining steps of the waveforms shown in FIGS. 2a 2b and 2c. After time $T_6$, the distrubtion of charge in capacitors 35ab, 35bc and 35ca is the same as that which existed at time $T_0$. Accordingly, it will be seen that a periodic repetition of the thyristor firing pattern shown in FIG. 3 will cause a periodic repetition of the above described cycle of wave generating activity.

Because switching devices 40 through 45 each direct discharge current flow through inductor 37, it will be seen that shunt regulating network 17 affords the desired wave generating activity with only one magnetic unit. This represents a reduction in the number of magnetic units from the number which has heretofore been necessary in any type of polyphase regulator. Thus, the circuit of FIG. 1 not only provides waveshaping activity not found in previously available regulator circuits but provides such activity with circuitry of reduced size and complexity.

Because, in addition, the above described resonant discharge currents flow through pairs of thyristors connected in the manner shown and flow through inductor 37 in one direction, the voltage "snap" produced by inductor 37 as current therein terminates is always of the same polarity and is borne by pairs of series-connected thyristors rather than by a single thyristor. As a result, the thyristor arrangement of FIG. 1 is less subject to false or unintended thyristor firings than previously available regulator circuits utilizing thyristors.

Upon the initial application of power to input terminals A, B and C, a substantial in-phase component of current flows into regulating network 17 to charge capacitors 35ab, 35bc and 35ca to the value necessary to initiate voltage regulating activity. Thereafter, regulating network 17 draws only negligible real power from the polyphase a-c input because the exchange of energy between capacitors 35ab, 35bc and 35ca takes place under virtually lossless conditions through inductor 37 and switching devices 40 through 45. Thus, after turn on, regulating network 17 draws only a relatively small in-phase current through conductors 31a, 31b and 31c.

The phase displacement between the regulating waves and the input voltage does, however, allow regulating network 17 to draw, through inductors 16A, 16B and 16C, sufficient quadrature or reactive current to induce across those inductors a voltage equal to the difference between the unregulated input voltage and the desired output voltage. Thus, the latter inductors serve as an active part of the regulating scheme and not merely as, for instance, filter elements. The above quadrature current flows principally in capacitors 35ab, 35bc and 35ca which may be selected to have capacitance values large enough to prevent the quadrature current from significantly altering the capacitor voltage waveforms. Thus, regulating network 17 controls the difference between the input and output voltages without significant expenditure of real power.

In addition to generating the quadrature current which regulates the output voltage with respect to the input voltage, network 17 also controls the flow of in-phase current from source 14 to assure that load 13 is provided with the required current. This control of in-phase current flow is accomplished by the same circuit activity which controls the output voltage, namely: varying the phase angle between the regulating waves and the input voltage. This is possible because each value of input voltage and output current within the regulating range of regulator 10 has associated with it a regulating wave-input voltage phase angle at which the quadrature current flowing through series regulating network 15 into shunt regulating network 17 will establish the desired output voltage and at which the level of in-phase current through series regulating network 15 will supply the desired load current. Thus, by controlling the firing times of thyristors 40 through 45, the output voltage can be maintained at the desired value in spite of changes in input voltage and output current.

To the end that the firing times of thyristors 40 through 45 may be controlled in the manner described above, there is provided control signal generating circuitry 47 which in the present embodiment includes a voltage controlled oscillator 48 and a signal translating circuit 49. Oscillator 48 senses the d-c output voltage through sensing leads 50 and 51 and provides, in the well-known manner, a pulse train of variable frequency on conductors 52 and 53, the latter pulse train having a frequency which is a whole-number multiple of the a-c input voltage frequency when the output voltage is at the desired value and which varies in either direction from that frequency as the output voltage varies in either direction from the desired value.

The above multiple is preferably equal to the number of steps which are to appear in a half-cycle of each regulating wave. In FIG. 1, for example, a half-cycle of each regulating wave consists of three discrete voltage steps (these steps being counted during one-half cycle of the voltage waveform, that is, from the zero voltage point $Z_1$ on the waveform to the next zero voltage point $Z_2$ of the waveform) and the quiescent output frequency of oscillator 48 should, therefore, be equal to three times the a-c input voltage frequency. It will, however, be understood that oscillator 48 may be made to operate at multiples of the input frequency which are greater than three if the number of discharge inductors and thyristors are increased to afford the charge control paths necessary to afford more than three voltage steps per half-cycle of each regulating wave.

Signal translating circuit 49 serves to apply firing signals to thyristors 40 through 45, in the sequence shown in FIG. 3, at a repetition rate determined by the frequncy of the output pulse train of oscillator 48. To this end, signal translating circuit 49 may consist of any suitable frequency dividing or counter circuits of types well-known to those skilled in the art.

The manner in which control signal generating means 47 controls the regulating waves at terminals 17a, 17b and 17c to produce a regulated output voltage will now be described. Assuming for a given a-c input voltage and a given d-c output current, that the phase angle between the regulating waves and the polyphase input voltage is such as to establish the desired output voltage at the required output current, oscillator 48 will apply to conductors 52 and 53 a pulse train which has a frequency three times greater than the polyphase input frequency. Under these conditions, signal translating circuit 49 causes regulating network 17 to generate regulating waves which have a frequency equal to the polyphase input frequency. Accordingly, the phase angle between the polyphase input voltage and the regulating waves remains constant, being maintained at that phase angle by the constant frequency of the regulating waves generated by network 17. Thus, the circuit of FIG. 1 is in a dynamic equilibrium condition.

If, under the above conditions, the current drawn by load 13 should increase, the output voltage between terminals 11 and 12 will decrease and thereby lower the frequency of the pulse train on conductors 52 and 53. This decrease in frequency, in turn, causes signal translating circuit 49 to reduce the frequency of the firing signals applied to switching devices 40 through 45. The latter decrease causes a decrease in the frequency of the regulating waves with the result that the phase angle between the regulating waves and the input voltage increases. This increases the in-phase and quadrature currents through regulating inductors 16A, 16B and 16C until the regulated output voltage is restored to its original value. Thereafter, the frequency of the regulating waves becomes equal to the a-c input frequency and the circuit is restored to equilibrium.

If, on the other hand, current drawn by load 13 should decrease, the d-c output voltage will begin to increase. This increase in output voltage increases the frequency of the pulse train generated by oscillator 48 and thereby increases the frequency of the firing signals applied to switching devices 40 through 45. This increases the frequency of the regulating waves and thereby reduces the phase angle between the input voltage and the regulating waves until the in-phase and quadrature currents through regulating inductors 16A, 16B and 16C assume values which restore the desired d-c output voltage. Thereafter, the frequency of the regulating waves becomes equal to the a-c input frequency and the circuit is restored to equilibrium.

It will be understood that if, in addition to the above changes in output current, the polyphase a-c input voltage should increase or decrease from the above assumed value, the phase angle between the polyphase input voltage and the regulating waves will change, as required, to compensate both for changes in output current and for changes in input voltage. Thus, wave generating network 17 together with series regulating network 15 and variable frequency controller 47 provide the desired voltage regulation with respect to input voltage and output current.

One advantage of using a voltage-controlled oscillator which, in its quiescent state, runs at a whole-number multiple of the a-c input frequency, is that increases or decreases in the phase angle between the input voltage and the regulating waves can be made during the course of rather than merely at the ends of each half-cycle. If, for example, the d-c output voltage should tend to change during time interval $T_2$ and $T_3$ in FIG. 2a, the circuit of the invention will cause corrective action to first be felt at time $T_3$, rather than at the end of the half-cycle as would be the case if a non-multi-stepped regulating wave such as a squarewave were used.

Another advantage of the multi-stepped waveforms shown in FIGS. 2a, 2b and 2c is that upon rectification by bridge 21, a substantially ripple-free d-c voltage is produced so long as inductor 37 has an inductance such that the duration of transition times $T_1$, $T_2$, etc., are kept short in relation to the duration of an input voltage cycle. Such substantially ripple-free voltage may be further smoothed by capacitor 29 which also contributes to clamping the amplitude of the regulating waves. On the other hand, if regulating circuit 10 is to drive an a-c load, it may be desirable to set the inductance of inductor 37 at a value such that the duration of transition times $T_1$, $T_2$, etc., are not short in relation to the duration of an input voltage cycle. This is because slowing the rate at which capacitors 35ab, 35bc and 35ca resonantly discharge and recharge rounds the corners of the regulating waves and thereby produces a more nearly sinusoidal output voltage waveform.

In the event that it is desirable for the capacitors of regulating network 17 to be connected in a star or wye configuration, this may be accomplished by substituting for regulating network 17 of FIG. 1, the shunt regulating network 17' shown in FIG. 4. The latter circuit includes capacitors 35an, 35bn and 35cn which are connected in a star or wye configuration between junctions a, b and c and neutral n.

Capacitors 35an, 35bn and 35cn receive an initial charge from source 14 through terminals 17a, 17b and 17c. This occurs in the manner described previously in connection with delta-connected capacitors 35ab, 35bc and 35ca of FIG. 1. To the end that this charge may be redistributed in a programmed sequence to generate the desired stepped regulating waves, waveshaping circuit 17' includes charge control circuitry having resonant discharge inductors 37ab, 37bc and 37ca and having controlled switching devices 40' through 45', here shown as thyristors. These inductors and thyristors control the charge in the capacitors of FIG. 4 in substantially the same manner as described previously in connection with FIG. 1, except that the capacitors of FIG. 2 exchange charge two at a time rather than three at a time as in the circuit of FIG. 1.

At time $T_0$, as shown in FIGS. 5a, 5b and 5c, junction a is positive from neutral n due to presence of stored charge on capacitor 35an, junction b is positive from junction n due to the presence of stored charge on capacitor 35bn and junction c is at the same potential as junction n due to the absence of stored charge on capacitor 35cn. Upon the application of a firing signal to thyristor 42' at time $T_1$, capacitor 35bn transfers its charge to capacitor 35cn by resonantly discharging through the path including capacitor 35cn, inductor 37bc and thyristor 42'. This resonant discharging terminates as the current through inductor 37bc falls to zero and renders thyristor 42' non-conducting. Thereafter, until time $T_2$ the voltages between junctions a, b and c have the magnitudes and polarities shown in time interval $T_1$–$T_2$.

Similar redistributions of charge (and voltage) occur at times $T_2$, $T_3$, $T_4$, $T_5$ and $T_6$ when thyristors 41', 44', 43', 40' and 45', respectively, are fired. The latter firing pattern together with the regulating voltage waveforms resulting therefrom are shown in FIGS. 6 and 5, respectively.

Although the capacitor voltage waveforms shown in FIGS. 5a, 5b and 5c differ from the capacitor voltage waveforms shown in FIGS. 2a, 2b and 2c, their effect on the associated series regulating circuitry is the same. This is because the voltages shown in FIGS. 5a, 5b and 5c are plotted with respect to neutral n in FIG. 4 and because plotting these same voltages with respect to terminals a, b and c yields the waveforms shown in FIGS. 2a, 2b and 2c. Accordingly, it will be seen that waveshaping circuit 17' of FIG. 4 can be substituited for wave-shaping circuit 17 of FIG. 1 without altering the performance of the circuit of FIG. 1.

In view of the foregoing, it will be seen that in practicing the invention, charge which is initially stored on one capacitor is transferred to one or more other capacitors, temporarily stored therein and recovered and, consequently, that each capacitor serves as a charge storage device for each other capacitor as charge is shifted from capacitor to capacitor to synthesize a regulating voltage wave having a controllable waveform and frequency.

It will be understood that the embodiments described herein are for illustrative purposes only and may be changed or modified without departing from the spirit and scope of the appended claims.

What is claimed is:

1. In a regulating circuit utilizing a regulating wave of controlled harmonic content, in combination, polyphase input means, output means, series regulating means, means for connecting said series regulating means between said polyphase input means and said output means, a plurality of charge storage means, means for connecting said storage means to one another, means for applying the voltages across said storage means to said series regulating means between said series regulating means and said output means, a plurality of inductance means, controllable switching means for connecting said inductance means to predetermined ones of said charge storage means to initiate redistributions of charge among said storage means, sensing means for generating a signal having a frequency which varies in accordance with the voltage at said output means and having a quiescent frequency which is at least three times greater than the frequency of the voltage at said input means, signal translating means for applying firing signals to said controllable conducting means in a predetermined sequence at a repetition rate determined by the frequency of the signals generated by said sensing means, means for connecting said sensing means to said output means and means for connecting said signal translating means to said sensing means and to said controllable switching means.

2. A regulating circuit as set forth in claim 1 in which said output means includes clamping capacitance means, rectifying means having a-c input terminals and d-c output terminals, means for connecting said a-c input terminals to said series regulating means and means for connecting said clamping capacitance means across said d-c output terminals.

3. In a regulating circuit utilzing a regulating wave of controlled harmonic content, in combination, a-c input means, output means, regulating inductance means, means for connecting said regulating inductance means between said a-c input means and said output means, a plurality of capacitors, means for connecting said capacitors to one another and in shunt with said regulating inductance means between said inductance means and said output means, discharge inductance means, controllable switching means, means for connecting said discharge inductance means and said controllable switching means to said capacitors to afford a plurality of selectable resonant current flow paths therebetween, means for energizing said controllable switching means in a predetermined, periodic sequence to redistribute charge among said capacitors in a multiplicity of discrete steps and means for controlling the frequency of the energization of said controllable switching means in accordance with the voltage at said output means.

4. A regulating circuit as set forth in claim 3 in which a d-c voltage is produced at said output means and in which each redistribution of charge among said capacitors is made to occur within a time interval which is short in relation to the period of the input voltage.

5. In a regulating circuit utilizing a regulating wave of controlled harmonic content, in combination, a-c input means, output means, regulating inductance means, means for connecting said regulating inductance means between said a-c input means and said output means, a plurality of capacitors, means for connecting said capacitors in a delta configuration, means for connecting said delta-connected capacitors in shunt with said inductance means between said inductance means and said output means, discharge inductance means, a plurality of controllable switching means, means for connecting said discharge inductance means and said switching means to said delta-connected capacitors to initiate and terminate reversals in the polarity of the charge on said capacitors, means for energizing said controllable switching means in a predetermined sequence to generate across said delta-connected capacitors a plurality of multi-stepped regulating waves, and means for advancing and retarding the conduction times of said switching means in accordance with the voltage at said output means.

6. A regulating circuit as set forth in claim 5 in which said output means includes clamping capacitance means, rectifying means having a-c input terminals and d-c output terminals, means for connecting said a-c input terminals to said regulating inductance means and means for connecting said clamping capacitance means across said d-c output terminals.

7. A regulating circuit as set forth in claim 6 in which reversals in the polarity of the charge on said capacitors are made to occur within time intervals which are short in relation to the period of the a-c input voltage.

8. A regulating circuit as set forth in claim 5 in which said means for connecting said delta-connected capacitors in shunt with said inductance means includes a transformer having at least one set of Wye-connected windings.

9. In a regulating circuit utilizing a regulating wave of controlled harmonic content, in combination, a-c input means, output means, regulating inductance means, means for connecting said regulating inductance means between said a-c input means and said output means, a plurality of capacitors, means for connecting said capacitors in a star configuration, means for connecting said star-connected capacitors in shunt with said inductance means between said inductance means and said output means, discharge inductance means, a plurality of controllable switching means, means for connecting said discharge inductance means and said switching means to said capacitors to initiate and terminate the resonant transfer of charge from a charged capacitor to an uncharged capacitor, means for energizing said controllable switching means in a predetermined sequence to generate across said star-connected capacitors a plurality of multi-stepped regulating waves, and means for advancing and retarding the firing times of said controllable switching means in accordance with the voltage at said output means.

10. A regulating circuit as set forth in claim 9 in which said output means includes clamping capacitance means, rectifying means having a-c input terminals and d-c output terminals, means for connecting said a-c input terminals to said regulating inductance means and means for connecting said clamping capacitance means across said d-c output terminals.

11. In a regulating circuit utilizing a regulating wave of controlled harmonic content, in combination, a-c input means, output means, a plurality of regulating inductance means, means for connecting said regulating inductance means between said a-c input means and said output means, a plurality of capacitors, means for connecting said capacitors to one another in a delta configuration, means for connecting said delta-connected capacitors in shunt with said inductance means between said inductance means and said output means, a plurality of controllable switching means each having first and second power terminals and a control terminal, means for connecting the first power terminals of predetermined ones of said switching means to respective junctions of said delta-connected capacitors, means for connecting the second power terminals of predetermined other ones of said switching means to said respective junctions of said delta-connected capacitors, first connecting means for connecting together the second power terminals of said predetermined ones of said switching means, second connecting means for connecting together the first power terminals of said predetermined other ones of said switching means, discharge inductance means, means for connecting said discharge inductance means between said first and second connecting means, means for energizing the control terminals of said switching means in a predetermined sequence to generate multi-stepped regulating waves across said delta-connected capacitors, and means for advancing and retarding the application of energizing signals to the control terminals of said switching means in accordance with the voltage at said output means.

12. A regulating circuit as set forth in claim 11 in which said output means includes clamping capacitance means, rectifying means having a-c input terminals and d-c output terminals, means for connecting said a-c input terminals to said regulating inductance means and means for connecting said clamping capacitance means across said d-c output terminals.

13. A regulating circuit as set forth in claim 11 in which said means for connecting said delta-connected capacitors in shunt with said regulating inductance means includes a transformer having at least one set of Wye-connected windings.

* * * * *